United States Patent Office 3,505,373
Patented Apr. 7, 1970

3,505,373
COMPLEX LEAD COMPOUNDS
Ralph C. Olberg, Sacramento, and Manfred Stammler, Carmichael, Calif., assignors to Aerojet-General Corporation, Azusa, Calif., a corporation of Ohio
No Drawing. Filed Aug. 13, 1963, Ser. No. 303,718
Int. Cl. C07f 7/24; C08g 22/44; C06b 15/00
U.S. Cl. 260—435                                   7 Claims The invention relates to novel lead compounds, their method of preparation, and their use as catalysts in the preparation of polyurethane plastics and propellants.

It is an object of this invention to prepare novel complex lead compounds. It is still another object of this invention to provide a novel class of catalyst promotors suitable for the preparation of polyurethane plastics. It is still another object of this invention to provide a new curing catalyst for use in the preparation of solid propellant formulations. These and other objects of this invention will be apparent from the detailed description which follows.

While the catalysts have general application to the preparation of polyurethanes, they are particularly advantageous in the catalysis of urethane systems containing trialkanolamine crosslinking agents. Heretofore it has been known that certain metal complex compounds would catalyze the reaction between active hydrogen compounds and isocyanate-containing compounds to produce polyurethane polymers. In the preparation of such polymers, particularly for use as binders in solid propellant compositions, it is desirable to include triethanolamine as a crosslinking agent since such compound enhances the mechanical and physical properties of the resultant propellant. However, it has been found that compounds such as triethanolamine tend to deactivate the metal catalysts heretofore employed. In a more particular application of this invention, it has now been found that a novel class of lead complex compounds may be employed in a polyurethane system containing compounds such as triethanolamine, without the occurrence of any catalyst deactivation. Thus, it is now possible by the practice of this invention to obtain polyurethane plastics and propellants which possess the advantages attendant with the use of amine crosslinkers without incurring the disadvantages associated with partial or incomplete cure.

The novel lead compounds of this invention have the following general formula

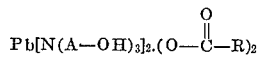

wherein R is hydrogen or alkyl and A is alkylene. Preferably in the above formula, all three of the R groups are alkyl. The most preferred R groups are lower alkyl groups containing from 1 to about 8 carbon atoms. The A group is preferably lower alkylene of from 1 to about 8 carbon atoms. The R and A groups may be branched or straight chain. In the above formula, R may be, for example, hydrogen, methyl, ethyl, isopropyl, t-butyl, octyl or decyl; and A may be, for example, methylene, ethylene, tetramethylene, hexamethylene and decamethylene.

Each of the above compounds contains a total of six A groups and two R groups. However, in a given compound all of the A groups need not be of the same chain length. Likewise, the two R groups in a given compound may be of a different chain length; i.e., methyl and propyl, etc.

The novel lead compounds of the above formula are prepared in accordance with the following general reaction equation

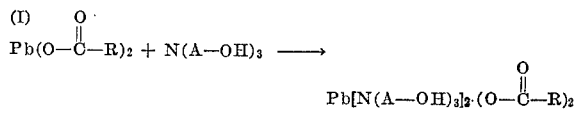

wherein R and A are as defined above. The above reaction is preferably carried out under anhydrous conditions in the presence of an inert solvent. Typical suitable solvents are the halohydrocarbons such as chloroform or carbon tetrachloride, and water. Optionally, the solvent may be dispensed with altogether an excess of one or the other of the reactants may be employed as the solvent for the reaction. In the above reaction, the reactants are normally used in approximately stoichiometric amounts except in the case noted above where one or the other of the reactants is employed in excess as a solvent for the reaction.

In reaction (I), it should be understood that the divalent lead reactant may be generated in situ by the reduction of the corresponding tetravalent lead compound. Thus, for example, lead diacetate may be conveniently generated from lead tetraacetate.

In the foregoing reaction, illustrative lead reactants are lead dipropionate, lead dibutyrate, lead dioctoate and lead tetrahexanoate. Typical trialkanolamine reactants are triethanolamine, tripropanolamine, tritertiarybutanolamine, trioctanolamine and tridecanolamine.

Preparation of the lead compounds, in accordance with the foregoing reaction is normally carried out conveniently at room temperature. However, higher temperatures may be used. In general, the reaction temperature is within the range of from about 0° C. to about 100° C. The reaction is usually carried out at atmospheric pressure, although pressure is not critical, and superatmospheric pressure as well as vacuum may be used.

The novel lead compounds of this invention may be isolated from the reaction medium in conventional manner, such as by filtration, crystallization and/or distillation.

The reaction of this invention as described above is most surprising since neither the alkanols nor the trialkylamines will react with the above-mentioned lead reactants to form a stable complex.

The examples of this patent are intended for purpose of illustration only and should not be regarded as limiting the scope of the invention in any way. In the example, the parts are by weight, unless otherwise indicated.

EXAMPLE I

Preparation of di-triethanolamine-lead (II) acetate

To a solution of 30.35 grams of lead diacetate in 200 ml. of chloroform was added 95.3 grams of triethanolamine. A slight exotherm developed and a white crystalline solid precipitated from solution. It was separated on a filter washed with chloroform. On recrystallization from ethanol, the small amount of the solid which was insoluble was removed on a filter. The clear filtrate yielded white crystals melting at 116–117° C.

*Analysis.*—Calculated for $C_{16}H_{36}O_{10}N_2Pb$ (percent): C, 30.80; H, 5.78; N, 4.49; Pb, 33.20. Found (percent): C, 31.10; H, 5.90; N, 4.60; Pb, 33.11.

When the foregoing example is repeated using lead diformate and lead dipropionate, in lieu of lead diacetate, good yields of di-triethanolamine-lead (II) formate, and di-triethanolamine-lead (II) propionate, respectively, are obtained.

When the above example is repeated employing lead tetrabutyrate in lieu of lead acetate, and tripentanolamine in lieu of triethanol amine, a good yield of di-tripentanolamine-lead (II) butyrate is obtained.

The polyurethane polymers which may be prepared with the aid of the novel lead compounds of this invention are normally the reaction product of a compound having two or more active hydrogen groups as determined by the Zerewitinoff method and capable of polymerizing with an isocyanate, with an organic compound having as its sole reacting groups two or more isocyanate groups. The compound having the active hydrogen groups is preferably an organic compound having as its sole reacting groups 2 to 4 hydroxy groups per molecule. Crosslinking agents, such as triethanolamine can also be used with the polyisocyanate reactant if desired.

It is evident from above that the wide variety of polyurethane polymers can be prepared employing the novel lead catalysts of this invention. Thus, the catalysts of this invention may be employed to prepare foamed polyurethanes. Likewise, the lead chelate catalysts may be used in the preparation of the noncellular polyurethane propellant binders useful in solid propellant formulations such as those disclosed in greater detail in assignees' copending applications, Ser. Nos. 829,180 and 829,182, now Patent No. 3,132,976 both filed July 23, 1959. As is well-known to those skilled in the art, it is necessary to have water or some other blowing or foaming agent present in order to form a foamed polyurethane. Conversely, the production of noncellular polyurethanes requires that water be substantially absent during polymerization.

The isocyanate compounds can be saturated or unsaturated, aliphatic or aromatic, or open or closed chain. The preferred isocyanates are the diisocyanates which are hydrocarbon, and except for the isocyanate groups, contain from 1 to 20 carbon atoms. Such diisocyanates include tolylene diisocyanate, hexamethylene diisocyanate and durene diisocyanate.

The preferred hydroxy starting materials for the polyurethane polymers are dihydroxy compounds having the general formula

OH—$R_1$—OH wherein $R_1$ is a divalent organic radical containing from 1 to 20 carbon atoms. The dihydroxy compounds particularly suitable as reactants for the polyurethane propellants of this invention are ethylene glycol, tetramethylene glycol and hexamethylene glycol. Among the preferred dihydroxy compounds suitable for the urethane reactions of this invention are polyesters such as those obtained from reaction of dihydric alcohol such as ethylene glycol or hexamethylene glycol with a dicarboxylic acid such as adipic acid or sebacic acid. The polyesters most suitable for purposes of this invention are those having a molecular weight from about 1000 to about 2500.

In addition to the polyesters the polyols such as the polyethylene ether glycols, polypropylene ether glycols, polytetramethylene ether glycols and other polyether glycols can be used. These polyols normally have molecular weights of from about 400 to about 10,000, and contain from 2 to 4 hydroxy groups per molecule.

It will be appreciated by those skilled in the art that mixtures of suitable polyhydroxy and/or polyisocyanate compounds can be used for the purposes of this invention if so desired.

Examples of compounds which may be optionally used as auxiliary crosslinking agents for the polyurethanes of this invention are, in addition to the trialkanol amines, glycerol monoricinoleate, glycerol triricinoleate, sorbitol, mannitol, glycerin and trimethylolpropane. The preferred crosslinking agents contain 3 or 4 hydroxy groups per molecule and have a molecular weight of from about 80 to about 800.

The following is an example of the preparation of a flexible, low density polyurethane foam using a lead compound within the scope of our invention as a catalyst.

EXAMPLE II

The following ingredients in the amounts specified are mixed rapidly by mechanical means.

| Ingredients: | Parts by weight |
|---|---|
| Polyester prepared from adipic acid, diethylene glycol and trimethylol, propane in the molar ratio of 1/1/0/0.05 | 100.00 |
| Tolylene diisocyanate | 48.00 |
| Di-triethanolamine-lead (II) acetate | 0.30 |
| Diethylamine oleate | 1.00 |
| Sulfonated castor oil | 3.00 |
| Water | 3.00 |
| Mineral oil | 0.50 |

As a result of the rapid mixing of the above ingredients a polyurethane foam which is flexible and of low density is formed.

In the above example, the sulfonated castor oil is present as a wetting agent, the diethylamine oleate is an auxiliary wetting agent, and the mineral oil is an agent which has the effect of helping to regulate the sizes of the pores formed in the foamed mass.

As has been noted above, the novel lead chelates of this invention may be employed to catalyze the preparation of polyurethane propellants. These propellants are used as the primary propulsion source in rockets and missiles. The propellant is preferably cast directly into the rocket chamber in which it is to be fired. Rocket chambers such as those in which the propellants are employed are ordinarily of the conventional type having one end open and leading to a venturi rocket nozzle. Upon ignition large quantities of gases are produced and exhausted through the nozzle creating propulsive force.

In addition to the urethane ingredients, the propellant contains inorganic oxidizing salts such as the perchlorates of ammonia, hydrazine and guanidine. Other inorganic oxidizing agents are potassium nitrate, ammonium nitrate and nitronium perchlorate. Organic oxidizing agents such as the organic amine perchlorates and nitrates disclosed in Assignees' co-pending U.S. patent application Serial No. 297,179 filed July 22, 1963, may also be used.

Various other additives may be employed in the propellants of this invention. For example, plasticizers familiar to those skilled in the art such as dioctyl azelate, bis-2,2-dinitropropyl acetal, bis-2,2-dinitropropyl formal, and isodecyl perlargonate may be utilized. Burning rate accelerators such as copper chromite may be used in an effective catalytic amount of from about 0.1 percent to about 4 percent by weight based on the total weight of the propellant.

Various other additives other than those specifically mentioned may also be employed in minor amounts in the propellant formulations. For example, antioxidants and metal fuels such as powdered aluminum and powdered beryllium may be used.

In preparing the propellants of this invention, the polyurethane polymerization may be carried out at any temperature, with room temperature being the most convenient. However, temperatures lower than, as well as higher than room temperature can be used for the polymerization reaction.

It is preferable to carry out the curing of the propellant at temperatures in the range of from about 70° F. to about 180° F. Within this range the reaction rate is sufficiently rapid for economical production and yet the temperature is not so high as to produce shrinkage and internal stresses which must be avoided, especially in the case of large solid propellant motors.

The processing and compounding of the propellants can be carried out in conventional manner in accordance with procedures well known to those skilled in the art.

The propellant binder is preferably employed in a proportion within the range of from about 5 to about 55 percent and the oxidizing agent in an amount within the range of from about 95 to about 45 percent by weight.

The proportions of the ingredients which go to make up the polyurethane binder can vary through wide ranges depending upon the properties desired in the plastic or propellant. Although stoichiometric proportions of hydroxy and isocyanate performance can be employed, it has been found that for rocket propellants, improved mechanical properties are obtained if there is present from about 100 to about 115 equivalents of isocyanates or isothiocyanate containing monomer in the fuel mixture for every 100 equivalents of hydroxy containing monomer therein.

The novel lead catalyst promotors for use in the preparation of polyurethane foams, plastics and propellants according to our invention may be employed in an effective catalytic amount, normally within the range of from about 0.02 to about 5.00 percent by weight on a total weight basis.

The following are solid propellants which are prepared employing the novel lead chelate catalysts of this invention.

EXAMPLE III

| Ingredients: | Parts by weight |
|---|---|
| Ammonium perchlorate | 72.00 |
| Aluminum | 12.00 |
| Copper chromite | 1.00 |
| Polypropylene ether glycol | 0.81 |
| Polybutylene ether glycol | 0.43 |
| Polypropylene triol | 8.43 |
| Triethanolamine | 0.05 |
| Tolylene diisocyanate | 0.80 |
| Di-triethanolamine-lead (II) acetate | 0.06 |
| Isodecyl pelargonate | 4.44 |
| | 100.00 |

EXAMPLE IV

| Ammonium perchlorate | 82.00 |
|---|---|
| Aluminum | 1.00 |
| Copper chromite | 1.00 |
| Phenyl betanaphthylamine (antioxidant) | 0.35 |
| Di-tributanolamine-lead (II) formate | 0.06 |
| Polytetramethylene ether | 10.20 |
| Glycerol monoricinoleate | 0.80 |
| Dioctyl azelate | 3.12 |
| Tolylene diisocyanate | 1.47 |
| | 100.00 |

Having fully described our invention, it is intended that it be limited only by the lawful scope of the appended claims.

We claim:

1. The lead compounds of the general formula

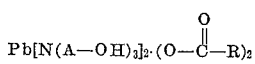

wherein R is selected from the group consisting of hydrogen and alkyl; and A is an alkylene radical.

2. The lead compounds of the formula

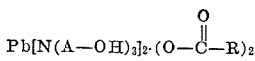

wherein in the above formula R is lower alkyl; and A is a lower alkenylene radical.

3. The method of preparing a lead compound of the formula

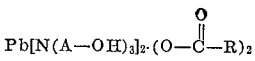

which comprises reacting a trialkanolamine of the formula

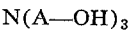

with a divalent lead compound of the formula

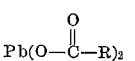

wherein R is selected from the group consisting of hydrogen and alkyl, and A is an alkylene radical.

4. The method of claim 3 wherein the divalent lead compound is generated in situ from the corresponding tetravalent lead compound.

5. The compound di-triethanolamine-lead (II) acetate.

6. The compound di-triethanolamine-lead (II) formate.

7. The compound di-triethanolamine-lead (II) propionate.

References Cited

UNITED STATES PATENTS

| 1,678,256 | 7/1928 | Klar | 260—436 |
|---|---|---|---|
| 2,597,025 | 5/1952 | Orth | 260—77.5 |
| 2,653,144 | 9/1953 | Wielicki | 260—77.5 |
| 2,692,874 | 10/1954 | Langerak | 260—77.5 |
| 2,959,605 | 11/1960 | Kebrich | 260—436 |
| 3,002,830 | 10/1961 | Barr | 149—19 |
| 3,072,698 | 1/1963 | Szczepanek et al. | 260—435 |
| 3,086,895 | 4/1963 | Schaeffer et al. | 149—19 |

TOBIAS E. LEVOW, Primary Examiner

H. M. S. SNEED, Assistant Examiner

U.S. Cl. X.R.

149—19; 260—2.5, 15, 18, 77.5, 404.5, 436